United States Patent [19]

Wright et al.

[11] 3,990,971

[45] Nov. 9, 1976

[54] METAL CYANIDE COMPLEX COMPOUND DISPOSAL

[75] Inventors: Danny W. Wright, Hickory, Ky.; Gary D. Carr, Carbondale, Ill.

[73] Assignee: Texaco Inc., New York, N.Y.

[22] Filed: Sept. 30, 1974

[21] Appl. No.: 510,198

[52] U.S. Cl. .................. 210/63 R; 210/DIG. 31
[51] Int. Cl.² ............................................ C02B 1/34
[58] Field of Search ............... 210/63, 62, 50, 60, 210/59, DIG. 31; 423/236, 235, 364

[56] References Cited
UNITED STATES PATENTS

| | | | |
|---|---|---|---|
| 2,989,147 | 6/1961 | Gollmar | 55/68 |
| 3,821,110 | 6/1974 | Luetzelschwab | 210/63 |
| 3,855,390 | 12/1974 | Matumoto et al. | 210/63 |

FOREIGN PATENTS OR APPLICATIONS 737,828   8/1969   Belgium

*Primary Examiner*—Charles N. Hart
*Assistant Examiner*—Benoit Castel
*Attorney, Agent, or Firm*—T. H. Whaley; C. G. Ries; Douglas H. May, Jr.

[57] ABSTRACT

Foul water streams from refining processes such as fluidized catalytic cracking, containing about 1–100 ppm metal cyanide complex compounds, are contacted with flue gas from combustion of hydrocarbonaceous fuels at temperatures of 750° F and higher for essentially complete decomposition of cyanide radicals.

1 Claim, No Drawings

ND COMPOUND
METAL CYANIDE COMPLEX COMPOUND DISPOSAL

BACKGROUND OF THE INVENTION

The present application relates to a method for disposal of dilute aqueous solutions of metal cyanide complex compounds. More particularly, the present application discloses a method for disposal of metal cyanide complex containing foul waters produced from a fluidized catalytic cracking process.

Many naturally occurring hydrocarbon oils, such as petroleum, shale oil, tar sand oils, and their fractions contain nitrogen compounds which under proper conditions react with metals, particularly iron, and carbon to form metal cyanide complex compounds. Reaction conditions which favor formation of such metal cyanide complex compounds include contact of nitrogen containing oil with metals such as iron at elevated temperatures of about 700° F and higher in a reducing atmosphere. The metal cyanide complex compounds so produced are at least slightly soluble in water, and commonly are recovered from refinery processes as components of various foul water streams, often in admixture with other undesirable reaction products such as phenol and hydrogen sulfide. Protection of environmental quality requires that such metal cyanide complex compounds be prevented from entering natural waters.

The major refining unit process wherein such metal cyanide complex compounds are formed is the Fluidized Catalytic Cracking Process. In this process, a small percentage of nitrogen compounds contained in the hydrocarbon charge is converted into metal cyanide complex compounds. These metal cyanide complex compounds are generally recovered in solution with foul waters from downstream process equipment employed in conjunction with fluidized catalytic cracking units. That is, metal cyanide complex compounds are commonly found in foul waters from fluidized catalytic cracking unit main fractionator overhead accumulation drums, compressor after-cooler receiver drums, debutanizer fractionator overhead accumulation drums, and other sources wherein liquid water is separated from hydrocarbon products of the fluidized catalytic cracking process.

Although some water may enter the fluidized catalytic cracking process with hydrocarbon charge, and some may be a reaction product, by far the largest volume of water enters the fluidized catalytic cracking process as stripping steam and fluidization steam employed to obtain performance of the fluidized catalytic cracking process. Such steam entering the reaction side of a fluidized catalytic cracking process is carried overhead with hydrocarbon product vapors and is condensed to liquid water in downstream processing equipment whenever conditions of temperature and pressure allow. Such condensed water may contain water soluble compounds formed in the fluidized catalytic cracking reaction, including hydrogen sulfide, phenols, and the metal cyanide complex compounds which are the subject of the present invention. Such condensed foul waters are accumulated and withdrawn from refinery process equipment for subsequent disposal.

The metal cyanide complex compounds are present in such foul waters in low concentration, generally less than 100 parts per million by weight (wppm), and usually about 2–10 wppm. These metal cyanide complex compounds are difficult to analyze, giving neither the reaction for the particular metals nor for cyanide in standard tests, and are considered to be one or more metal complexes of ferrous and/or ferric cyanide. As many metals, particularly the alkaline, alkaline earth, and iron group metals can form such metal cyanide complexes with cyanide compounds such as ammonium cyanide, ferrous cyanide, and ferric cyanide, and since many of these metals may be present in the reaction zone of a fluidized catalytic cracking unit, a great number of such metal complex cyanides are potentially present in the recovered foul waters.

Many methods have been proposed for disposal of cyanide compounds contained in industrial waste waters. These methods include biological reduction, chemical reduction, and incineration. Biological processes were found to be insufficiently controllable to insure reduction of the cyanides within a reasonable time. Chemical processes, such as reaction of the metal cyanide complexes with ferrous sulfate in an acidic or alkaline medium and subsequent removal of the cyanide as a Prussian Blue sludge, are effective. However, chemical costs are substantial and the sludge disposal becomes an environmental problem. Incineration of the cyanide containing foul water in the presence of a flame and oxygen is effective for disposal of the metal cyanide complex containing foul water. Additionally, phenols may be disposed of in an incinerator. The major draw-back to incineration of such foul water is a special incinerator must be constructed and fuel for the incineration must be supplied, all at substantial cost.

More than 1 year prior to this application, foul water containing hydrogen sulfide, phenols, and metal cyanide complex compounds was employed as spray water in a fluidized catalytic cracking unit regenerator for cooling the cyclones and dilute phase temperature control. This was undertaken as a water saving method, and disposal of cyanides was not contemplated, consequently, only a portion of cyanide containing foul water available was disposed of in this matter. Disadvantages of this method of cyanide disposal include contact of cracking catalyst with the cyanide compounds, which are known to have a deleterious effect upon the catalyst. Also, use of the unstripped foul waters places additional sulfur in the flue gas exiting the fluidized catalytic cracking unit.

SUMMARY OF THE INVENTION

Now, according to the present invention, we have discovered an improved method for disposal of foul waters containing about 2–100 ppm metal cyanide complex compounds in an environmentally acceptable manner. In a preferred embodiment, foul waters, containing about 2–100 ppm metal cyanide complex compounds are contacted with hot flue gas comprising about 8–15 volume percent $CO_2$, 0–10 volume percent CO, 15–25 volume percent $H_2O$, 0.1–2.0 volume percent $O_2$, for residence time of at least about 10 sec., such that said foul waters are completely vaporized and said metal cyanide complex compounds are decomposed at temperatures in the range of 750°–2000° F. Additionally, such foul waters may contain 0–2000 ppm phenolic compounds which are likewise decomposed upon contact with such flue gas.

The advantages of this improved method include: the cyanide radicals in said metal cyanide complex compounds are decomposed, and phenolic compounds are decomposed thus eliminating their environmental hazard. Additionally, no special reaction or incineration vessels are required, since said foul waters may be sprayed directly into a flue gas line. Also, cyanide compounds are not contacted with any process catalyst, such as fluidized catalytic cracking catalyst, which may be reduced in activity by contact with cyanides. These and other advantages will be set forth more completely in the detailed description which follows.

DETAILED DESCRIPTION OF THE INVENTION

Metal cyanide complex compounds which may be decomposed according to the method of the present invention include those produced from the refining of petroleum, shale oil, tar sand oil, etc., particularly the metal cyanide complex compounds formed in fluidized catalytic cracking processes. Such metal cyanide complex compounds are difficult to analyze for composition as they occur in oil refinery foul water streams. These compounds do not give the normal reactions for either the metals involved or for cyanide. Also other impurities present in the foul waters make specific analysis difficult with existing analytical techniques. It is known that when such foul waters are contacted with air or when treated with ferric sulfate under alkaline or acid conditions, a dark blue precipitate is obtained. This precipitate is thought to be "Prussian Blue", a fero ferricyanide. Thus, the metal cyanide complex compounds are considered to contain iron, however, it is presently unknown whether other metals are also involved in the cyanide complex compounds. Such metal cyanide complex compounds are primarily formed in the reaction sections of fluidized catalytic cracking units, wherein organic and inorganic nitrogen compounds of the hydrocarbon charge stock are, contacted with carbon at temperatures of about 850–1050° F. Metals for formation of the complex cyanide compounds are present in the hydrocarbon charge, in the cracking catalyst and as the materials of construction of the process equipment.

The primary source of metal cyanide complex compounds in an oil refinery are foul waters recovered from the fractionation section of fluidized catalytic cracking units. Commonly, such foul waters contain from about 2–10 ppm cyanide compounds, and may contain up to 100 ppm or higher. In addition to metal cyanide complex compounds, such foul waters generally contain substantial amounts of hydrogen sulfide, ranging up to 3 weight percent, and also generally contain phenolic compounds in the range of 0–2000 ppm. According to the process of this invention, such foul water may be charged directly into a hot flue gas stream for decomposition of the metal complex cyanide contained therein. However, the presence of hydrogen sulfide has certain deleterious effects under such conditions. That is, severe corrosion may result, if liquid water containing hydrogen sulfide and cyanide compounds is contacted with steel structural members, piping, etc., at elevated temperatures. Also, hydrogen sulfide may react with oxygen to form sulfur dioxide, which adds to atmospheric pollution. Additionally, a portion of the hydrogen sulfide may remain unreacted and escape into the atmosphere with vented flue gas, thus contributing to additional atmospheric pollution. Consequently, foul water containing hydrogen sulfide as well as metal cyanide complex compounds, and generally containing phenolic compounds, is preferably treated for removal of hydrogen sulfide prior to injecting such foul water into a hot flue gas stream. The most common treatment for removal of such hydrogen sulfide is by stripping, wherein the foul water in the liquid phase is contacted with a stripping vapor such as steam, dry gas, etc., for vaporization of the hydrogen sulfide. Such stripping processes are well known and widely practiced in petroleum refinery operations.

The hydrogen sulfide thus removed from the foul water may then be disposed of in a non-polluting manner, such as conversion to elemental sulfur in a Claus process unit, or by other convenient means.

Foul water, stripped of hydrogen sulfide, and containing the metal cyanide complex compounds and any phenolic compounds which may be present, is then contacted with hot flue gas under conditions such that the foul water is totally vaporized and such that the temperature of the resulting vapor mixture of flue gas and foul water is 750° F or above. Preferably, foul water and flue gas are contacted in such volume ratios, that the cyanide content of the resulting mixture does not exceed 50 ppm. Although as the process of this invention is commonly practiced, cyanide content of the vapor mixture is substantially below 50 ppm. At temperatures below about 750° F, decomposition of metal cyanide complex compounds and subsquent reaction of such decomposition products, may not be complete. Temperatures greater than 750° F, up to the maximum the structure may safely withstand, are advantageous, in that decomposition of the metal cyanide complex compounds will proceed more rapidly. Contact time of at least 10 sec. for hot flue gas with such metal cyanide complex compounds at 750° F and higher temperatures are preferred. Such contact time is desirable to insure decomposition of the metal cyanide complex compounds and subsequent reaction of the decomposition products. Under such reaction conditions, phenolic compounds which may be present in the foul water are also decomposed or reacted with element of the flue gas to non-polluting reaction products, such as carbon dioxide and water.

As stated hereinabove, the composition of the metal cyanide complex compounds is not known, although it is felt certain that iron is one constitutent element. Consequently, the exact reactions which the metal cyanide complex compounds undergo in the presence of the hot flue gas are unknown. However, many reactions of simple metal cyanides, metal cyanide complexes and their decomposition products, such as hydrogen cyanide are known. For instance, the carbon-nitrogen bonds of the cyano group are broken in step wise hydrolysis to amids and subsequently ammonium salts of carboxylic acids, upon reaction with $H_2O$ at elevated temperatures. Such ammonium salts of carboxylic acid will react with oxygen at temperatures of 750° F and higher, for further decomposition. Also, ferrous ferrocyanide which decomposes at temperatures above 100° (212° F) into hydrogen cyanide and ammonium cyanide. Hydrogen cyanide, at elevated temperatures in the presence of steam is converted to carbon monoxide and ammonia. Many other reactions of cyanide complex are known to the general chemical art. However, since the exact composition of the metal cyanide complex compounds are unknown, we do not wish to be bound to any particular decomposition and-/or reaction mechanism.

Flue gas compositions which have been found to be effective for decomposition of the metal cyanide complex compounds of the present inventions are those resulting from combustion of hydrocarbonaceous materials with air. Particularly, flue gas from regeneration of fluidized catalytic cracking catalyst has been found to be effective for such decomposition. The major constitutent of such flue gas is nitrogen, although it is not felt to be reactive under the circumstances. Other constituents present in such flue gases include $CO_2$, CO, $O_2$, $H_2O$ and generally $SO_2$. One or all of these latter named compounds may be reactive with either the metal cyanide complex compounds or their decomposition products at the temperatures contemplated in the present invention. Consequently, flue gases which are known to be effective in the present invention include those comprising about 8–15 volume percent $CO_2$, 0–18 volume percent CO, 15–25 volume percent $H_2O$, and 0.1–2 volume percent $O_2$, with the major constituent generally being nitrogen. Additionally, such flue gases generally contain from about 0–0.5 volume percent $SO_2$.

In order to better example the present invention, the following example is provided. This example is by way of demonstration only and is not to be construed as limiting the invention as set out in the appended claims.

EXAMPLE I

A foul water stream, at a rate of 30 gpm, containing 6936 ppm $H_2S$, 1100 ppm phenolic compounds and 30 ppm metal cyanide complex compounds was charged at 80° F to the upper portion of a foul water stripper and 50 psig stripping steam, at a rate of 1500 lb. per hour, was charged to the bottom of the foul water stripper. Steam and hydrogen sulfide were recovered overhead from the foul water stripper for subsequent hydrogen sulfide recovery. From the foul water stripper, stripped foul water, containing 50 ppm $H_2S$, 350 ppm ppm phenolic compounds and 30 ppm metal cyanide complex compounds at a temperature of 250° F and a flow rate of 39 gpm was charged to the cooling sprays located in a fluidized catalytic cracking unit regenerator flue gas line. Such stripped foul water, upon spraying into the flue gas line was vaporized by 300 thousand pounds per hour of flue gas having a temperature of about 850° F. Composition of the flue gas was 10.7 volume percent $CO_2$, 8.3 volume percent CO, 0.1 volume percent $SO_2$, 0.1 volume percent $O_2$, 26 volume percent $H_2O$, and 54.8 volume percent $N_2$. Residence in the flue gas line and stack was about 15 seconds for conversion of cyanide compounds and phenols into non-polluting compounds.

We claim:
1. A method for disposal of foul water containing about 2–100 ppm metal cyanide complex compounds, up to about 2000 ppm phenolic compounds and up to about 3 weight percent hydrogen sulfide which process comprises:
   a. stripping said foul water in a stripping zone for removal of substantially all the hydrogen sulfide; and
   b. contacting such stripped foul water with flue gas comprising about 8–15 volume percent $CO_2$, 5–10 volume percent CO, 0.1–2 volume percent $O_2$, and 15–25 volume percent $H_2O$, in the absence of catalyst, at a temperature of about 750° F and higher for a time of at least 10 seconds, for essentially complete decomposition of metal cyanide complex compounds and phenolic compounds.

* * * * *